United States Patent Office 3,798,330
Patented Mar. 19, 1974

3,798,330
METHODS AND COMPOSITIONS FOR IMPROVING FEED EFFICIENCY OF RUMINANTS USING POLYPENTAERYTHRITOL HALOACETALDE-HYDE HEMIACETALS
Roger C. Parish, King of Prussia, and John E. Trei, Malvern, Pa., assignors to Smithkline Corporation, Philadelphia, Pa.
No Drawing. Continuation-in-part of applications Ser. No. 881,868, Dec. 3, 1969, now abandoned, Ser. No. 881,915, Dec. 3, 1969, now Patent No. 3,615,649, and Ser. No. 78,188, Oct. 5, 1970, now Patent No. 3,745,221. This application Mar. 17, 1971, Ser. No. 125,371
Int. Cl. A61k 27/00
U.S. Cl. 424—342
14 Claims

ABSTRACT OF THE DISCLOSURE

Polypentaerythritol haloacetaldehyde hemiacetals are potent inhibitors of methanogenesis in the ruminant animal. Consequently these chemical agents improve the feed efficiency in ruminants at levels which do not have general antifermentation effects in the animal. The most useful and representative compounds are the dipentaerythritol penta- and hexachloral hemiacetals and tripentaerythritol hexa-, hepta- and octachloral hemiacetals. Methods of administration, feed compositions and premixes containing said inhibitors are described. The preparation of feed mixtures using these compounds is much easier due to their physical stability.

---

This is a continuation-in-part application of our earlier but pending applications Ser. No. 881,868 filed Dec. 3, 1969, now abandoned; Ser. No. 881,915 filed Dec. 3, 1969, now Pat. No. 3,615,649 and Ser. No. 78,188 filed Oct. 5, 1970, now Pat. No. 3,745,221.

This invention relates to advantageous new methods and compositions for improving the feed efficiency in ruminant animals using specified polypentaerythritol haloacetaldehyde hemiacetals as active ingredients. These methods and compositions use oral administration of effective quantities of the active ingredients to inhibit methanogenesis in the rumen itself. One result of these inhibitors of methane is an apparent decrease in gaseous loss of carbon and hydrogen during fermentation and alteration of rumen metabolism as, for example, a shift toward producing more desirable fatty acids for growth especially propionic and butyric acids. These are more readily utilized by the ruminant to increase the efficiency of rumen digestion of feed to give more weight gain on the same or less ingested feed. Details of the supposed mechanism of action and testing procedures are outlined in our previous pending applications referred to above.

In our earlier copending applications we disclosed the use of certain pentaerythritol chloral hemiacetals to be very active in improving feed efficiency in rumiants, to be of low cost and to form acceptable feed and premix compositions.

Also in our previous applications the desirability of having a high halo or hemiacetal content was disclosed.

A disadvantage in the use of pentaerythritol polyhaloacetaldehyde hemiacetals in feed or premix composition is due to their physical characteristics. These active ingredients are relatively low melting, at times even being viscous glasses. Melting points of the preferred pentaerythritol tetrachloral hemiacetal of Ser. No. 78,188 are in the range of 50-55° C. This low melting point lends difficulty in grinding or milling the material since it tends to gum. Also the chemical itself is hygroscopic which property although controllable is not preferred from a handling, stability and cost viewpoint. The presence of even one additional grinding step or a single special precaution in packaging to prevent gumming due to the hygroscopic nature of the active material might make the cost advantage to the feed producer marginal and the resulting feeds and premixes commercially not feasible.

We have now surprisingly found that certain haloacetaldehyde hemiacetals of polypentaerythritols are physically stable, have melting points in a most workable range such as 65-80° C. and equally active as methanogenesis inhibitors in ruminant animals as is pentaerythritol tetrachloral hemiacetal.

Certain of these compounds are in the chemical literature used as starting materials for preparing polyurethane foams, U.S. Pat. No. 3,137,661. This patent describes only the trichloralhemiacetal of dipentaerythritol. It also describes this class of compounds, column 3, last paragraph, as "characterized by a high room viscosity." Contrary to this teaching we found these compounds to be easily and cheaply prepared, physically stable, relatively high melting and most active ingredients for ruminant feed supplementation.

The active ingredients in the methods and compositions of this invention are haloacetaldehyde hemiacetals of polypentaerythritols. "Polypentaerythritol" is an art recognized term, U.S. Pat. No. 2,441,944. More specifically the compounds useful as active ingredients in this invention may be exemplified by the following structural formula:

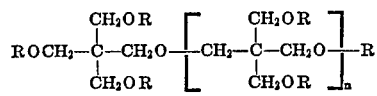

in which $n$ is an integer of from 1–13 inclusive and R is hydrogen or a polyhalohemiacetal residue of the structure $X_3C—CH(OH)—$ in which $X_3$ is a polyhalo, that is 2- or 3-bromo or chloro atoms, at least one R group being hemiacetal per pentaerythritol unit.

Preferred compounds are those with chloral hemiacetal residues. Especially preferred are the chloral hemiacetal derivatives of di- or tri-pentaerythritol. The hexa- and penta-chloral hemiacetals of dipentaerythritol and the hexa- and heptachloral hemiacetals of tripentaerythritol are of particular interest.

The polypentaerythritol starting materials containing from 2–14 units are well described in the literature, especially in U.S. Pat. Nos. 3,337,495, 2,462,049 and 2,552,532. Other preparations are described in "The Pentaerythritols" by Berlow et al., Reinhold, 1958. Polypentaerythritols of higher molecular weight may be used to prepare haloacetaldehyde hemiacetals which are active but no advantage seems to be present over the specific compounds disclosed here.

The active ingredients of this invention are prepared by the methods described in U.S. Pat. Nos. 2,784,237 and No. 3,137,661. Briefly the known polypentaerythritol and the desirable mole equivalent amount of haloacetaldehyde are reacted in an unreactive solvent such as benzene or toluene or preferably no solvent usually at reflux temperature until reaction is complete. In the latter case if the product is a solid, the molten product is then poured onto trays, cooled and broken up. The active ingredients of this invention are stable solids of sufficiently high melting points to permit grinding and formulation into feed by conventional means. Those with at least two chloral units per pentaerythritol unit are particularly advantageous because of their stability, ease of formulation into the feed and premix composition of this invention and because of their high level of chlorine content. The latter property is directly proportional to antimethanogenesis activity.

The exact number or position of halohemiacetal groups present is immaterial if the chemical composition of the active ingredient is reproducible according to standard analytical procedures. Chlorine content is a most useful analytical tool. Not all the available hydroxy groups on the polypentaerythritol need be reacted.

Among the more useful compounds to be active ingredients in this invention are dipentaerythritol penta- and hexachloral hemiacetals and tripentaerythritol hexa- and heptachloral hemiacetals. These compounds have exceptionally low costs of preparation and formulation into the feed compositions combined with high activity.

As far as we can determine the chemical compounds described above have not been described in the prior art to have any useful biological activity. Only one compound has been previously specifically described, namely dipentaerythritol trichloral hemiacetal. Therefore, the new compounds described herebelow for the first time are of particular advantage since they have higher activity and are more commercially useful for the grower. These are claimed as a part of this invention, for example, such as the compounds of the following formula:

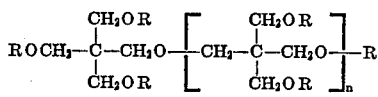

in which R is hydrogen or chloral hemiacetal having an average of at least two chloral units per pentaerythritol unit, $n$ being an integer of from 1–13 inclusive. Especially claimed are dipentaerythritol hexa- and pentachloral hemiacetals and tripentaerythritol octa-, hepta- and hexachloral hemiacetals.

The polypentaerythritol haloacetaldehyde hemiacetal chemical ingredients are incorporated into feed or feed premix compositions in effective but nontoxic quantities which increase feed efficiency. The compositions are then fed to ruminant animals as usual in the agriculural art, mostly ad libitum.

The ruminant feeds most generally used in conjunction with the method of this invention are either the roughage feeds such as silage or various commercial grain mixtures commonly used in ruminant animals, that is, in cattle or sheep. The amount of additive used to supplement such feeds will be an amount sufficient to improve the feed efficiency of the animal but not to have a pharmacodynamic or otherwise toxic or noxious effect. For example, in the broad range of about 10 g. to 2 kg. of additive per ton of feed (about 0.001–0.2%) preferably from about 50–600 g./ton. An average sheep will ingest about 3–4 lbs. of feed daily. An average cow will ingest about 20–25 lbs. Therefore, the broad range of dosage for ruminants (sheep to cows) is roughly about 50 mg.–7 g. per day.

As a specific preferred example, dipentaerythritol pentachloral hemiacetal (PTH) may be used at the rate of from about 50–500 g./ton of feed for sheep preferably about 200–400 g./ton. In using ingredients having fewer haloacetal groups, i.e., a lower chlorine or bromine content, larger amounts in the range are used, more groups lower amounts.

For commercial use, the active ingredients are most readily used as premix formulations in which the chemical is distributed uniformly throughout a standard animal feed carrier in an amount to give active levels of chemical ingredient at tonnage amounts as described above when diluted to whole feed. This premix or concentrate is mixed with either a normal or a special fattening diet of the ruminant as described. Examples of such carriers are soybean meal, corn oil, ground corn, barley, wheat, mineral mixtures such as vermiculite, diatomaceous earth, corn gluten meal, corn distillers soubles or soy flour. The active ingredient will be in amounts to satisfy the criteria set forth above for whole feed. The active ingredient will usually be present in from about 5.75% by weight of the premix composition depending largely on the physical properties and activity of the active ingredient.

The animal feeds themselves may also contain cellulosic roughage such as cellulose, hay, straw, corn stalks, cotton seed hulls, oats, barley and cereal brans; natural oils such as animal fats, fish oils, safflower oil, peanut oil and cottonseed oil, antioxidants, minerals, vitamins; antibiotics; anthelmintics; and other appropriate medicaments.

A typical prepared animal feed is as follows:

| | |
|---|---:|
| Mixed hay _____percent__ | 40.0 |
| Ground yellow corn _____percent__ | 45.0 |
| Soybean oil meal _____percent__ | 7.0 |
| Cane molasses _____percent__ | 7.0 |
| Dicalcium phosphate _____percent__ | 0.5 |
| Trace mineral salt _____percent__ | .5 |
| Vitamin A _____I.U./lb.__ | 300 |
| Vitamin D _____I.U./lb.__ | 150 |
| Dipentaerythritol pentachloral hemiacetal (DPH) _____g./top of feed__ | 300 |

An example of a suitable premix is as follows:

| | |
|---|---:|
| Dipentaerythritol tetrachloral hemiacetal (DTH) _____g__ | 200 |
| Ground yellow corn, to 3 lb. | |

Another might be a 10% mixture of active ingredient and vermiculite.

In the field the active ingredients may be administered by means of salt or molasses blocks. A typical block may be prepared using the following conditions:

| Ingredient: | Wt. percent |
|---|---:|
| Dried cane molasses _____ | 44.54 |
| Ground soybean hulls _____ | 24.90 |
| Tripentaerythritol hexachloral hemiacetal (THH) _____ | 5.00 |
| Granulated salt _____ | 21.59 |
| Trace minerals and vitamins _____ | 0.20 |
| Stabilized animal fat _____ | 1.11 |
| Moisture _____ | 2.66 |

The method of this invention comprises allowing the cattle or sheep to graze or be fed ad libitum on the supplemented rations or to be hand fed on a regular schedule.

Normally we have found feed efficiency increases of from about 10–15% using normal fattening diets and conditions.

The ability of the polyhydric alkanol polyhalohemiacetal derivatives of this invention to improve feed utilization in ruminants is primarily evaluated by means of a test which measures in vitro methane gas production plus total gas production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gasses are sampled by hypodermic needle from the flask and run through a gas partitioner (column chromatography) which separates and quantitates the components. The liquids (volatile fatty acids, etc.) are analyzed by gas liquid chromatography. Among the products measured are carbon dioxide, lactic acid, ethanol, hydrogen, ammonia nitrogen and fatty acids having from 2 to 6 carbon atoms. Reduction in the percent methane produced of 20% is considered significant. However, with compounds used in the present invention, reduction of 90–100% without reduction of overall fermentation is not uncommon. Ability of a particular compound to reduce the amount of methane generated without adversely reducing the overall rate of fermentation is determined by comparing the total (m$\mu$ moles/ml.) volatile fatty acids produced in control systems with those containing test compound. Also most significant is the distribution of fatty acids obtained.

The effect of the polyhydric alkanol polyhaloacetal derivatives of this invention in reducing methane production without causing a reduction in the rate of overall fermentation at effective concentrations, when tested by the above procedures, is shown by the data below.

A predetermined concentration of test compound was added to fermentation in flask as described above. The data in Table I is for parts of active ingredient per amount of rumen fluid, i.e., parts per million with resulting significant methane inhibition. Generally speaking, 100 p.p.m. equals 0.01% of diet or 90.8 g./ton of feed.

TABLE I

| Compound | P.p.m. | Percent methane reduction |
|---|---|---|
| Dipentaerythritol hexachloral hemiacetal | 12 | 75 |
| | 24 | 95 |
| Dipentaerythritol pentachloral hemiacetal | 12 | 75 |
| | 24 | 95 |
| Tripentaerythritol heptachloral hemiacetal | 12 | 88 |
| | 24 | 98 |
| Tripentaerythritol hexachloral hemiacetal | 12 | 88 |
| | 24 | 95 |

The results of in vivo tests which correlate methane inhibition with a desired shift in ratio of fatty acid production in the rumen to the more efficiently utilized acids especially propionate is presented in Table III. This represents the analysis of rumen content evaluated statistically which results from the substantially complete inhibition of rumen methanogenesis by the derivatives noted above.

The in vitro data presented in Table II was confirmed by specific in vivo tests (Table III) as follows:

Each dose level represents a test group of two head of pinhole fistulated sheep. The animals were fed the additive (DPH) mixed with morning and evening feeds comprised of either 50% or 80% concentrations fed at 90% ad libitum amounts. The sheep would eat all the supplemented feed in one hour. The results ran for a 7-day period.

Samples were withdrawn from the rumen 4–5 hours after the morning feeding and again 15–18 hours after the evening feeding. Analysis of the samples by gas partitioner and G.L.C. for gas and fatty acid content were carried out.

TABLE II

| | Percent | | P.p.m. |
|---|---|---|---|
| | $CO_2$[a] | $CH_4$[a] | |
| Dipentaerythritol hexachloral hemiacetal | 69 | 8 | 12 |
| | 65 | 2 | 24 |
| Dipentaerythritol pentachloral hemiacetal | 65 | 7.5 | 12 |
| | 63 | 4 | 24 |
| Control | 68 | 32 | 0 |
| Tripentaerythritol heptachloral hemiacetal | 82 | 3 | 12 |
| | 77 | 0.5 | 24 |
| Tripentaerythritol hexachloral hemiacetal | 80 | 1.6 | 12 |
| | 80 | 0.5 | 24 |
| Control | 75 | 25 | 0 |

[a] Values corrected for atmospheric contamination.

EXAMPLE 1

Dipentaerythritol (254 g., 1 mole) and chloral (737 g., 5 mole) are heated under reflux for four hours on a 140° C. oil bath. The hot product is poured onto a tray and allowed to cool. After pulverization the dipentaerythritol pentachloral hemiacetal melts at 68–78° C. Cl, 54.6%.

EXAMPLE 2

The process of Example 1 is repeated using four moles of chloral. The product is dipentaerythritol tetrachloral hemiacetal.

EXAMPLE 3

The process of Example 1 is repeated using 25.4 g., 0.1 mole of diphenaerythritol and 0.5 mole of dichloroacetaldehyde to give dipentaerythritol tetradichloroaldehyde hemiacetal.

EXAMPLE 4

The process of Example 1 is repeated using 372 g. of dipentaerythritol and 1123 g., 4 moles of bromal to give dipentaerythritol tetrabromal hemiacetal.

EXAMPLE 5

The process of Example 1 is repeated using tripentaerythritol (490 g., one mole) and chloral (1179 g., eight moles) to give after refluxing for eight hours tripentaerythritol octachloral hemiacetal.

EXAMPLE 6

The process of Example 1 is repeated using tripentaerythritol (490 g., one mole) and chloral (884.4 g., six moles) to give after refluxing for eight hours tripentaerythritol hexachloral hemiacetal.

Other similar derivatives can be prepared by the same process by varying the proportions using higher pentaerythritols such as pentapentaerythritol, hexapentaerythritol, heptapentaerythritol or nonapentaerythritol with various amounts of bromal, dichloroacetaldehyde, dibromoacetaldehyde or preferably chloral. An inert solvent may optionally be employed in which case the product is isolated by filtration or evaporation of the inert solvent. As alternative procedures the hydrates of chloral or bromal may be used in appropriate solvents azeotropic with water. In this case the product is isolated by filtration or is obtained following evaporation of the solvent.

As used herein the terms "hemiacetal," "chloral," "bromal" or combinations thereof denote the residue $X_3C$—$CH(OH)$—. The above description and examples are intended to teach how to utilize this invention. The following claims are not intended to limit the invention.

We claim:

1. The method for improving the feed utilization of ruminant animals comprising administering orally to such animals an effective but nontoxic quantity of polypentaerythritol haloacetaldehyde hemiacetal derivative of the formula:

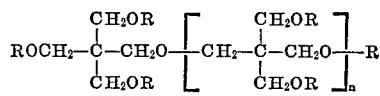

TABLE III

Experiment design: Each value represents average of two lambs and four days collection collection in simple switchover

| Ration[a] | $CO_2$ | $CH_4$ | $H_2$ | $C_2$ | $C_3$ | $C_4$ | $iC_5$ | $C_5$ | Total VFA[c] (um./ml.) |
|---|---|---|---|---|---|---|---|---|---|
| 50% control | 67 | 32 | 1 | 60.2 | 26.2 | 9.5 | .3 | 2.1 | 30.1 |
| 50% treated[b] | 78 | 8 | 13 | 48.2 | 36.7 | 12.0 | 1.4 | 1.8 | 38.9 |
| 80% control | 80 | 18 | 2 | 48.1 | 36.9 | 8.8 | .23 | 5.78 | 42.9 |
| 80% treated[b] | 82 | 7 | 10 | 34.3 | 49.8 | 6.5 | | 9.5 | 76.2 |

[a] Lambs fed 50 and 80% concentrate all pelleted rations and adapted to basal rations for 16 days prior to sampling.
[b] Dipentaerythritol pentachloral hemiacetal (DPH) administered via rumen cannulae— 250 mg. suspended in .5% solution of tragacanth.
[c] Differences in total ruminal VFA levels was a function of feed intake and should not be regarded as drug effect.

in which n is an integer of from 1-13 inclusive and R is hydrogen or a polyhalohemiacetal group derived from a polyhaloacetaldehyde with a minimum average of one said polyhalo hemiacetal group per unit of pentaerythritol, wherein said polyhalo is 2 or 3 bromo or chloro atoms.

2. The method of claim 1 in which n is 1 or 2 and R is —CH(OH)—CCl$_3$.

3. The method of claim 1 in which the quantity of polyhydric alkanol haloacetaldehyde hemiacetal is from about 10 g. to about 2 kg. per ton of feed.

4. The method of claim 1 in which the quantity of active ingredient is from about 50–600 g. per ton of feed.

5. The method of claim 1 in which the quantity of active ingredient is from about 50 mg.–7 g. per ruminant animal per day.

6. The method of claim 1 in which the quantity of active ingredient is about 200 g. per ton of feed.

7. The method of claim 1 in which the active ingredient is dipentaerythritol pentachloral hemiacetal.

8. The method of claim 7 in which the active ingredient is present in the feed at the rate of about 100–400 g./ton of feed.

9. The method of claim 7 in which the active ingredient is present in the feed at the rate of about 200 g./ton of feed.

10. A ruminant animal feed comprising an animal feed supplemented by a quantity effective for improving the feed utilization of ruminant animals but nontoxic to said animals of a polypentaerythritol haloacetaldehyde hemiacetal derivative of the formula:

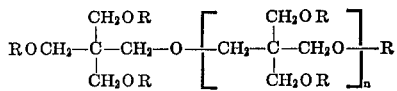

in which n is an integer of from 1-13 inclusive and R is hydrogen or a polyhalohemiacetal group derived from a polyhaloacetaldehyde with a minimum average of one said polyhalohemiacetal group per unit of pentaerythritol, said quantity of polypentaerythritol haloacetaldehyde hemiacetal being from about 10 g. to about 2 kg. per ton of animal feed and in which polyhalohemiacetal groups said polyhalo is 2 or 3 bromo or chloro atoms.

11. The animal feed of claim 10 in which the halo acetaldehyde is chloral.

12. The animal feed of claim 11 in which the quantity of polypentaerythritol chloral hemiacetal is from about 50–600 g. per ton of feed.

13. The animal feed of claim 11 in which the quantity of polypentaerythritol chloral hemiacetal is sufficient to feed about 50 mg. to 7 g. per ruminant animal per day.

14. The animal feed of claim 11 in which the polypentaerythritol chloral hemiacetal is dipentaerythritol pentachloral hemiacetal.

References Cited
UNITED STATES PATENTS
3,663,710   5/1972   Parish et al. _____ 424—342

SAM ROSEN, Primary Examiner